United States Patent [19]

Ng

[11] Patent Number: 4,945,422

[45] Date of Patent: Jul. 31, 1990

[54] FALSE DENSITY CONTOUR SUPPRESSION USING STORED RANDOM PROBABILITIES TO FORM PRINT/NO-PRINT DECISIONS

[75] Inventor: Yee S. Ng, Fairport, N.Y.

[73] Assignee: Eastman Kodak Company, Rochester, N.Y.

[21] Appl. No.: 459,497

[22] Filed: Jan. 2, 1990

[51] Int. Cl.$^5$ .......................... H04N 1/23; H04N 1/40
[52] U.S. Cl. .................................... 358/298; 358/456; 358/460
[58] Field of Search ............... 358/298, 447, 456, 462, 358/464, 457, 460, 455; 382/50

[56] References Cited

U.S. PATENT DOCUMENTS 4,245,258  1/1981  Holladay ............................ 358/460
4,821,109  4/1989  Roe .................................... 358/456

Primary Examiner—Bruce A. Reynolds
Assistant Examiner—Scott A. Rogers
Attorney, Agent, or Firm—Milton S. Sales

[57] ABSTRACT

False contouring of a screened halftone image without including more sub-elements in each cell, increasing the size of each cell, or decreasing the screen frequency of the image is accomplished by assigning to each sequential sub-element of a halftone cell a weighted probability of being "ON" in accordance with the value of the associated input signal. The weighted probability signal is converted to a binary value without a real time random number generator by a memory device having a plurality of rows, wherein each row represents a different probability that a sub-element will be "ON". The rows are accessed on the basis of the weighted probability of a sub-element being "ON".

7 Claims, 3 Drawing Sheets

FIG. 5

| | | COLUMN | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 92 | 93 | 94 | 95 | 96 | 97 | 98 | 99 | 100 |
| ROW | 1 | 0 | 0 | 0 | 0 | 0 | 0 | 1 | 0 | 0 | 0 | 0 | 0 | 1 | 0 | 0 | 0 | 0 | 0 |
| | 2 | 1 | 0 | 0 | 1 | 0 | 0 | 0 | 0 | 0 | 0 | 1 | 0 | 0 | 0 | 1 | 0 | 0 | 0 |
| | 3 | 0 | 1 | 0 | 0 | 0 | 1 | 0 | 0 | 0 | 0 | 0 | 1 | 0 | 0 | 0 | 0 | 0 | 1 |
| | 4 | 0 | 0 | 0 | 1 | 0 | 0 | 1 | 0 | 0 | 1 | 1 | 0 | 0 | 1 | 0 | 0 | 0 | 1 |
| | 5 | 1 | 0 | 0 | 1 | 0 | 0 | 1 | 0 | 0 | 1 | 0 | 0 | 0 | 1 | 0 | 0 | 1 | 0 |
| | 6 | 0 | 1 | 0 | 1 | 0 | 1 | 0 | 1 | 0 | 1 | 0 | 0 | 0 | 1 | 0 | 0 | 0 | 0 |
| | 7 | 1 | 1 | 1 | 0 | 0 | 1 | 0 | 1 | 0 | 0 | 1 | 0 | 0 | 1 | 0 | 1 | 0 | 0 |
| | 8 | 0 | 0 | 1 | 1 | 0 | 1 | 0 | 1 | 0 | 0 | 0 | 1 | 0 | 1 | 0 | 1 | 1 | 0 |
| | 9 | 1 | 1 | 0 | 0 | 1 | 0 | 1 | 0 | 0 | 1 | 1 | 0 | 1 | 1 | 0 | 1 | | 0 |
| | 10 | 0 | 0 | 1 | 1 | 1 | 1 | 0 | 1 | | 0 | 1 | 1 | 0 | 1 | 0 | 1 | 1 | 0 |
| | 11 | 0 | 1 | 0 | 1 | 1 | 0 | 0 | 0 | 1 | 1 | 0 | 0 | 1 | 0 | 0 | 0 | 0 | 0 |
| | 45 | 0 | 1 | 1 | 1 | 1 | 0 | 1 | 0 | 1 | 0 | 1 | 1 | 0 | 1 | 1 | 1 | 0 | 1 |
| | 46 | 1 | 0 | 1 | 1 | 0 | 1 | 1 | 0 | 1 | 1 | 1 | 1 | 0 | 1 | 1 | 1 | 1 | 1 |
| | 47 | 1 | 1 | 1 | 1 | 0 | 1 | 1 | 1 | 1 | 1 | 1 | 0 | 1 | 1 | 1 | 1 | 1 | 1 |
| | 48 | 1 | 1 | 1 | 1 | 1 | 1 | 1 | 1 | 0 | 1 | 1 | 1 | 1 | 1 | 0 | 1 | 1 | 1 |
| | 49 | 1 | 1 | 1 | 1 | 1 | 1 | 1 | 1 | 1 | 1 | 1 | 1 | 1 | 1 | 1 | 1 | 1 | 1 |

FALSE DENSITY CONTOUR SUPPRESSION USING STORED RANDOM PROBABILITIES TO FORM PRINT/NO-PRINT DECISIONS

CROSS-REFERENCE TO RELATED APPLICATION

Reference is made to commonly assigned, co-pending U.S. patent application Ser. No. 459,496 filed in the names of Hwai T. Tai and Yee S. Ng et al. concurrently hereith.

BACKGROUND OF THE INVENTION

1. Technical Field

This invention relates generally to conversion of a probability signal to a binary value, and is especially useful for encoding pictorial imagery for reproduction on binary display and/or printing systems.

2. Background Art

Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density. Continuous tone images are simulated by organizing groups of sub-elements into halftone cells which have gray level capabilities equal to the number of sub-elements in the cell plus one.

False contours are artifacts resulting from gray scale quantization steps which are sufficiently large to create a visible density step when the input image is truly a smooth, gradual variation from one to the other. Commonly assigned, co-pending U.S. patent application Ser. No. 459,496 filed in the names of Hwai T. Tai and Yee S. Ng et al. concurrently herewith is concerned with suppressing false contours in screened images. In that application, each sequential sub-element of a halftone cell is assigned a weighted probability of being "ON" in accordance with the gray level value of the associated pixel of the input signal. While the Ng patent application discloses one embodiment which incorporates a real time random number generator implementation to assign a weighted probability to each sub-element being "ON", real time random number generators are calculation intensive, and therefore time consuming.

DISCLOSURE OF THE INVENTION

It is an object of the present invention to provide for conversion of a weighted probability signal to a binary value without a real time random number generator.

It is another object of the present invention to suppress false contouring of a screened halftone image by assigning each sub-element a weighted probability of being printed in accordance with the gray level value of the associated picture element being reproduced without employing a real time random number generator.

These and other objects of the present invention are realized by apparatus which includes means for selectively printing sub-elements sequentially organized into halftone cells; means for assigning to each sequential sub-element of a halftone cell a weighted probability of being "ON" in accordance with the value of the associated input signal; and means for converting the weighted probability of each sub-element into a print/no-print decision, the converting means including (1) memory means having a plurality of rows, wherein each row represents a different probability that a sub-element will be "ON", and (2) means for accessing different rows of said memory means on the basis of the weighted probability of a sub-element being "ON".

According to a preferred embodiment of the present invention, each row includes a plurality of memory columns filled with print and no-print commands randomly distributed within the row, with the percent of print commands being equal to the percent probability that the sub-element represented by that row will be "ON".

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 5 is a schematic view of a memory device according to one embodiment of the present invention.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figures 1, 2:
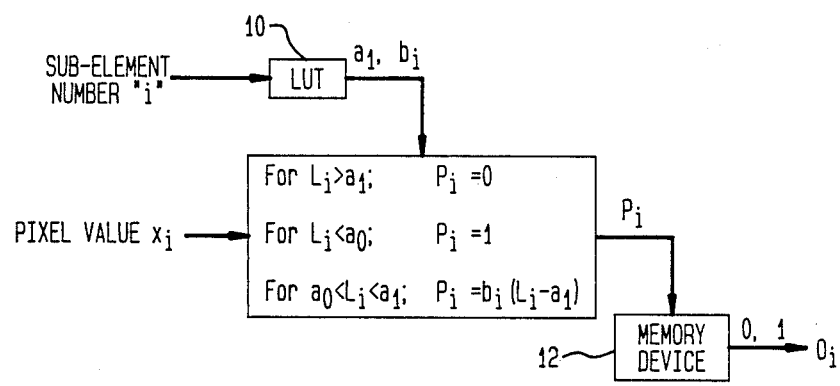
FIG. 1 is a typical electronic halftone function unit cell known in the prior art.
FIG. 2 is a schematic view of another embodiment of the electronic screening process according to the present invention.

There are many formats for electronic halftone cells at various screen angles and screen frequences. FIG. 1 shows a sequence number matrix for a halftone screen design at 97 lines per inch ruling with a 400 dpi at $400 \times 400$ addressable points per square inch. There are eighteen levels of gray (17 sub-elements plus white) associated with each halftone cell which is enclosed within the thick lines in the figure. The numeral that is associated with each sub-element within a halftone cell is the sequence number that the sub-elements within the cell is filled sequentially as the density in the cell increases. Each halftone cell is stacked to form a halftone screen with screen angle of 104°.

FIG. 2 shows a schematic view of the electronic screening process described in the aforementioned Ng et al. U.S. patent application. Signal $X_1$ represents the lightness or gray level information at a pixel sampling point "i" of an image. Each sub-element "i" of a halftone cell is assigned a probability that the associated sub-element is turned "ON" for a given lightness value. This eliminates the sudden jump in density when the input pixel lightness value is close to an output threshold value.

Figure 3:
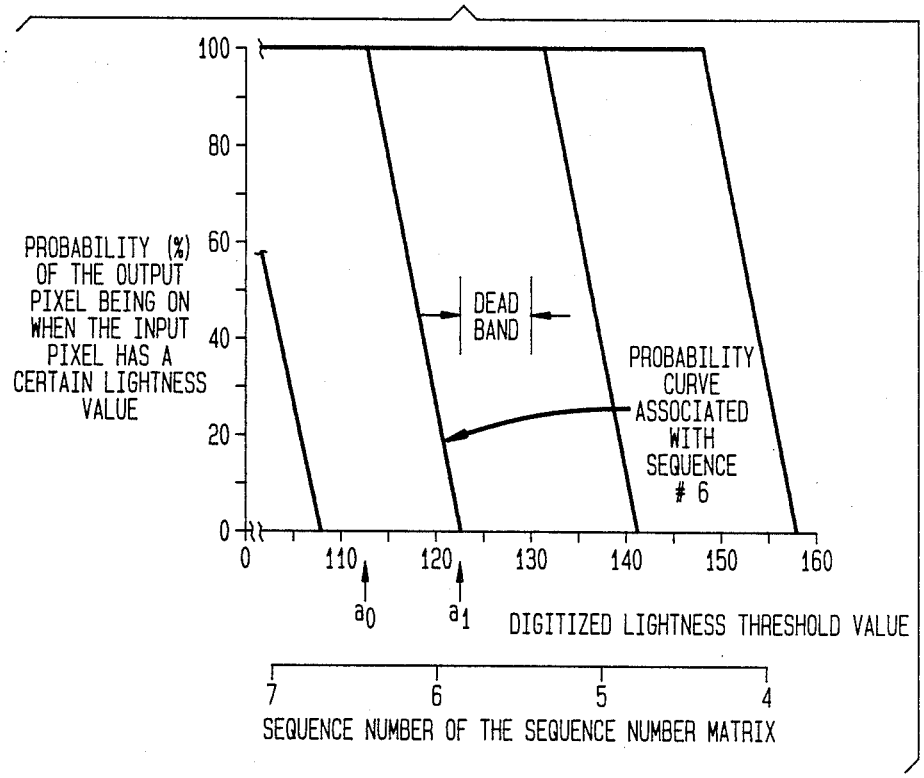
FIG. 3 is a probability curve of the output sub-element being "ON" when the input pixel value is at a certain lightness.

FIG. 3 is a portion of a probability curve of the output sub-element being "ON" when the input pixel value is at a certain lightness. One way to provide a probability of turning "ON" a particular sub-element is to allow a 50% probability sub-element turn-on rate at a predetermined lightness value, and to assume an equal probability distribution on each side of the threshold value from 0% to 100%. This would preserve the tone reproduction of the system in a broad area, and would, in effect distribute the output threshold values into spacial frequency space to give a sensation of gray that is not available when the number of addressable sub-elements within a halftone cell is limited.

Figure 4:
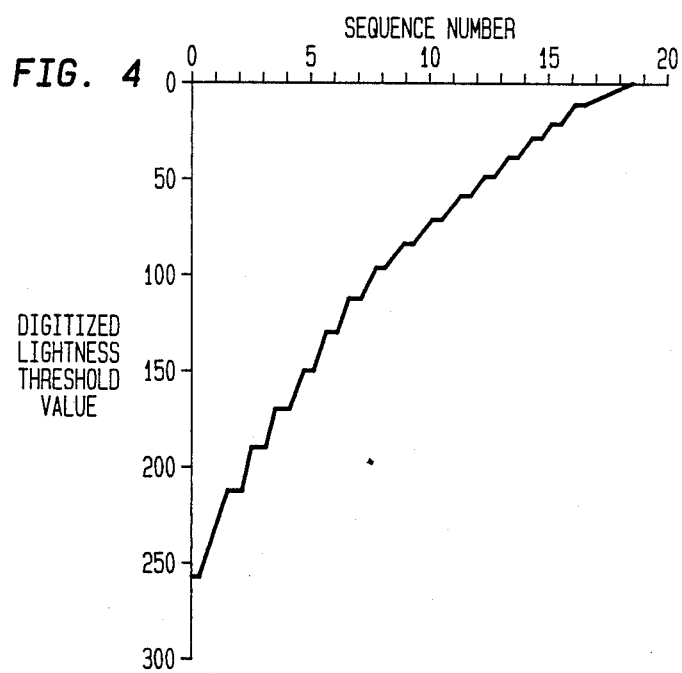
FIG. 4 is a plot of digitalized lightness threshold values versus sequence numbers of a halftone cell according to the present invention.

In the illustrated example of FIG. 3, a 50% probability of turning "ON" the sub-element at sequence number 6 is set at an input pixel lightness value of 117 (117 was chosen for this example because it was the threshold value of sequence number 6 in FIG. 4). A uniform probability distribution is assumed on both sides of the 50% position to preserve tone reproduction. In this case a linear distribution is assumed, although it does not need to be. At an input lightness value of less than 112, the probability of that sub-element being "ON" is 100%. Similarly, at an input lightness value of more than 123, the probability of that output sub-element being "ON" is 0%. Between these two values, the probability varies linearly.

The probability distributions of each threshold value can overlap that of the neighboring threshold values. Alternatively, as shown in FIG. 5, it may be desirable to leave a "dead band" between the probability distributions to reduce granularity; especially when there are very few gray levels available (very few addressable sub-elements) within a halftone cell. The width of the dead band is a trade off between contouring and granularity, and less dead band is needed as the number of gray levels increase to, say, about 32 gray levels; beyond which generally no dead band is needed.

FIG. 4 is a plot of the digitalized threshold values verses the sequence number for the latter case, where a dead band is provided. Note that the sudden jumps in lightness threshold values as a function of sequence number have been greatly smoothed in FIG. 4. As a result, the density contouring problem has been greatly reduced.

Referring back to FIG. 2, when a sub-element of the halftone cell is to be printed, that sub-element's number "i" is inputted to a table look-up 10. The look-up table does not contain a threshold screen function value as in conventional systems. Rather, if the probability factors are linear as shown in FIG. 3, look-up table 10 provides the intercept "$a_1$" (the highest lightness value for the probability function for sub-element "i") and the slope "$b_1$" of the line between $a_0$ (the lowest lightness value for the probability function for sub-element "i") and $a_1$, where $$a_0 = a_1 + 1/b_1.$$

The intercept $a_1$ and slope $b_1$ of the sub-element in question, along with the lightness value $L_p$, are used to calculate a probability factor $P_i$ according to the following equations:

For $L_i > a_1$; $P_i = 0$

For $L_i < a_0$; $P_i = 1$

For $a_0 < L_i < a_1$; $P_1 = b_i(L_i - a_1)$

Probability factor $P_i$ is inputted to a memory device 12 which can be pictured as a table with "j" number of rows and "k" number of columns. The table is made up of "print" and "no-print" decisions. Each row represents a different probability factor that a sub-element will be printed.

For example, FIG. 5 is a memory location table for memory device 12 of FIG. 2. There are 49 rows and 100 columns. The 49 rows of memory represent a 2% probability increment from 2% to 98% sub-element "ON" probability. Within each row of memory, there are 100 memory locations which are filled with logical ONEs and ZEROs randomly distributed within the row; with the percent of ONEs equal to the percent probability the sub-element represented by that row will be "ON". For example, a 60% "ON" row will have 60 logical ONEs and 40 logical ZEROs randomly distributed within the row.

Referring back to FIG. 3 an input lightness value of 116 at the output sub-element number location 6 will produce a calculated probability factor $P_i$ of 60%. This value inputted to memory 12 will access the row (in this case row number 30) which is most closely associated with the $P_i$ value. A column (0 to 99) in row 30 is randomly selected (via a random number generator, by shifting the address of the column after each access, or by use of a noise generator and A/D converter to get the random access). The value in that memory location (logical ONE or Zero) represents a randomly generated, 60% probability that the sub-element will be "ON".

While the 49 rows of memory 12 which generate the probability can be used for every sequence number location "i", the values of $a_0$ and $a_1$ will of course be different. Also, if one desires a non-linear probability function, a different equation is needed to calculate $P_i$. However, after $P_i$ is calculated, memory 12 can be used to get a weighted value in a random fashion for contour suppression purposes. Further modification to the system can be a different number of memory locations within each row, or a different number of rows, to get different precision.

The invention has been described in detail with particular reference to preferred embodiments thereof, but it will be understood that variations and modifications can be effected within the spirit and scope of the invention.

What is claimed is:

1. Apparatus for suppressing false density contours in halftone reproduction of continuous tone original images which have been converted to a series of discrete picture element signals, said apparatus comprising:

means for selectively printing sub-elements sequentially organized into halftone cells;

means for assigning to each sequential sub-element of a halftone cell a weighted probability of being "ON" in accordance with the value of an associated picture element signal; and means for converting the weighted probability of each sub-element into a print/no-print decision, said converting means including (1) memory means having a plurality of rows, wherein each row represents a different probability that a sub-element will be "ON", and (2) means for accessing different rows of said memory means on the basis of the weighted probability of a sub-element being "ON".

2. Apparatus for suppressing false density contours in halftone reproduction of continuous tone original images which have been converted to a series of discrete picture element signals, said apparatus comprising:

means for selectively printing sub-elements sequentially organized into halftone cells;

means for assigning to each sequential sub-element of a halftone cell a weighted probability of being "ON" in accordance with the value of an associated picture element signal; and means for converting the weighted probability of each sub-element into a print/no-print decision, said converting means including memory means having (1) a plurality of rows, wherein each row represents a different probability that a sub-element will be "ON", and (2) a plurality of memory locations in each row, said memory locations being filled with print and no-print commands randomly distributed within the row, with the percent of print commands being equal to the percent probability that the sub-element represented by that row will be "ON".

3. Apparatus as set forth in claim 2 further comprising addressing means for accessing a row based on the weighted probability of a sub-element being "ON".

4. Apparatus as set forth in claim 2 further comprising:

addressing means for accessing a row based on the weighted probability of a sub-element being "ON"; and means for randomly selecting a memory location of an accessed row.

5. Apparatus for suppressing false density contours in halftone reproduction of continuous tone original images which have been converted to a series of discrete picture element signals, said apparatus comprising:

means for selectively printing sub-elements sequentially organized into halftone cells;

means for assigning to each sequential sub-element of a halftone cell a weighted probability of being "ON" in accordance with the value of an associated picture element signal; and means for converting the weighted probability of each sub-element into a print/no-print decision, said converting means including memory means having a plurality of rows and columns, wherein each row represents a uniform probability increment from 0% to 100% that a sub-element will be "ON".

6. Apparatus as set forth in claim 5 further comprising means for accessing different rows of said memory means on the basis of the weighted probability of a sub-element being "ON".

7. Apparatus as set forth in claim 6 further comprising means for randomly selecting a column of an accessed row.

* * * * *